(12) United States Patent
Kandasamy et al.

(10) Patent No.: US 8,838,644 B2
(45) Date of Patent: Sep. 16, 2014

(54) EXTENSIBLE ACCESS CONTROL LIST FRAMEWORK

(75) Inventors: Madhusudanan Kandasamy, Bangalore (IN); Vidya Ranganathan, Bangalore (IN); Murali Vaddagiri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 885 days.

(21) Appl. No.: 12/625,826

(22) Filed: Nov. 25, 2009

(65) Prior Publication Data

US 2011/0125799 A1    May 26, 2011

(51) Int. Cl.
*G06F 7/00* (2006.01)
*G06F 17/30* (2006.01)
*G06F 21/62* (2013.01)

(52) U.S. Cl.
CPC .... *G06F 21/6218* (2013.01); *G06F 2221/2141* (2013.01)
USPC .......................................................... 707/781

(58) Field of Classification Search
None
See application file for complete search history.

(56) References Cited

U.S. PATENT DOCUMENTS

| | | | | |
|---|---|---|---|---|
| 5,572,709 | A * | 11/1996 | Fowler et al. | 703/27 |
| 5,689,706 | A * | 11/1997 | Rao et al. | 1/1 |
| 6,625,603 | B1 * | 9/2003 | Garg et al. | 707/758 |
| 6,625,614 | B1 * | 9/2003 | Chang et al. | 1/1 |
| 7,512,990 | B2 | 3/2009 | Haugh et al. | |
| 2005/0216788 | A1 * | 9/2005 | Mani-Meitav et al. | 714/6 |
| 2006/0080443 | A1 * | 4/2006 | Kruglick et al. | 709/227 |
| 2006/0123005 | A1 | 6/2006 | Burnett et al. | |
| 2008/0320474 | A1 * | 12/2008 | Jelinek et al. | 718/1 |
| 2009/0077087 | A1 | 3/2009 | Urano et al. | |
| 2009/0144804 | A1 | 6/2009 | Idicula et al. | |
| 2010/0235885 | A1 * | 9/2010 | Persson et al. | 726/4 |

FOREIGN PATENT DOCUMENTS

| | | |
|---|---|---|
| WO | 2009023586 A2 | 2/2009 |
| WO | 2009043262 A1 | 4/2009 |

OTHER PUBLICATIONS

Gundem, Taflan I; Kocaturk, Mustafa M; "A Fine-Grained Access Control System Combining MAC and RBACK Models for XML;" Informatica, 2008, vol. 19 No. 4 pp. 517-534; Institute of Mathematics and Informatics, Vilnuis; http://www.mii.lt/informatica/pdf/INF0723.pdf.

Cao, Xiang; Iverson, Lee; "Intentional Access Management: Making Access Control Usable for End-Users;" Symposium on Usable Privacy and Security (SOUPS) 2006; Jul. 12-14, 2006; 11 pages; Pittsburgh, PA USA; http://cups.cs.cmu.edu/soups/2006/proceedings/p20_cao.pdf.

Gundem, Taflan I; Kocaturk, Mustafa M; "A Fine-Grained Access Control System Combining MAC and RBACK Models for XML;" Informatica, 2008, vol. 19 No. 4 pp. 517-534; Institute of Mathematics and Informatics, Vilnuis; http://www.mii.lt/informatica/pdf/INFO723.pdf.

(Continued)

*Primary Examiner* — Taelor Kim
(74) *Attorney, Agent, or Firm* — D'Ambrosio & Menon, PLLC; Usha Menon (57) ABSTRACT

Methods, systems, and products for governing access to objects on a filesystem. In one general embodiment, the method includes providing a framework in an operating system environment for support of a plurality of access control list (ACL) types, thereby enabling governing of access to objects on a filesystem according to an associated definition of an ACL type; and accepting definitions of ACL types. The associated definition may comprise a kernel extension.

24 Claims, 5 Drawing Sheets

(56) References Cited

OTHER PUBLICATIONS

Chae, Jung Hwa; Shirt, Nematollaah; "Description Logic Framework for Access Control and Security in Object-Oriented Systems;" RSFDGrC 2007; LNAI 4482; pp. 565-573; Springer-Verlag Berlin Heidlberg 2007. http://portal.acm.org/citation.cfm?id=1577589.

Watson, Robert et al.; "The Trusted BSD MAC Framework: Extensible Kernal Access Control for free BSD 5.0" USENIX Association; 2003 USENIX Annual Technical Conference; pp. 285-296.

Karjoth, Gunter et al; "Implementing ACL Based Policies in XACML;" 2008 Annual Computer Security Applications Conference; pp. 183-192.

* cited by examiner

EXTENSIBLE ACCESS CONTROL LIST FRAMEWORK

BACKGROUND

Access to files in a filesystem may be controlled according to an access control list ('ACL'). An ACL may be used to specify access permissions to filesystem objects, such as files and directories. An ACL may include a list of many entries and different permissions to each of the entries. Each entry may define a user or a group.

SUMMARY

Methods, systems, and computer products for an extensible ACL framework are disclosed herein. Embodiments of the present disclosure may be implemented as a filesystem framework and kernel extensions. One general embodiment includes a computer-implemented method for governing access to objects on a filesystem including providing a framework in an operating system environment for support of a plurality of access control list (ACL) types, thereby enabling governing of access to objects on a filesystem according to an associated definition of an ACL type; and accepting definitions of ACL types.

Another general embodiment includes a computer-implemented method for controlling access to a filesystem. The method includes receiving a request to control access to a filesystem object with an access control list (ACL) of an ACL type corresponding to one of multiple ACL type definitions available in memory; and, in response to receiving the request to control access to the filesystem object using the ACL of the ACL type, controlling access to the object according to the ACL, and the ACL type definition. Controlling access to the object according to the ACL and the ACL type definition may be carried out by storing an indicator of the ACL type in association with the object; and, in response to receiving a request to access the object, retrieving the ACL type definition according to the indicator and governing access to the object according to the ACL and the retrieved ACL type definition. Another computer-implemented method for controlling access to a filesystem may include receiving an access control list (ACL) type definition defining the ACL type; and storing the access control list (ACL) type definition in memory.

Other general embodiments include a system for governing access to objects on a filesystem. The system comprises one or more computers comprising a processor and a computer memory operatively coupled to the processor. The computer memory of one or more of the computers has disposed within it computer program instructions for execution on the processor to implement one or more of the method embodiments described above.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION

Exemplary methods, systems, and computer products for governing access to objects on a filesystem are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises and/or comprising," when used in this specification, specify the presence of stated features, integers, steps, operations, elements, and/or components, but do not preclude the presence or addition of one or more other features, integers, steps, operations, elements, components, and/or groups thereof.

The corresponding structures, components, acts, and equivalents of all means or step plus function elements in the claims below are intended to include any structure, material or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF (radio frequency), etc., or any suitable combination of the foregoing.

Computer program code for carrying out operations for aspects of the present invention may be written in any combination of one or more programming languages, including an object oriented programming language such as JAVA™, SMALLTALK™, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
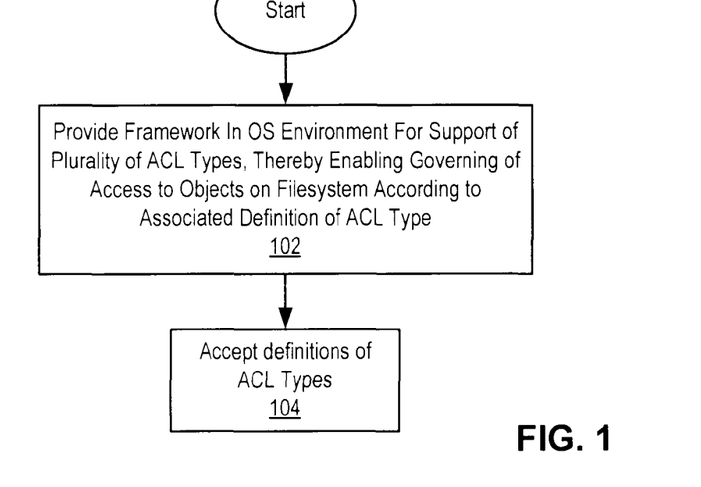
FIG. 1 sets forth a flow chart illustrating a method for governing access to objects on a filesystem according to embodiments of the present invention.

FIG. 1 sets forth a flow chart illustrating a method for governing access to objects on a filesystem according to embodiments of the present invention. Referring to FIG. 1, the method includes two related tasks. The method comprises providing a framework in an operating system environment for support of a plurality of ACL types, the framework enabling governing of access to objects on a filesystem according to an associated definition of an ACL type (block 102); and accepting definitions of ACL types (block 104). Objects may include files, directories, or other software or hardware resources, such as device files. The various forms of access of, for example, a file may include depositing, reading, editing, copying, sharing, deleting, and so on.

Various operating systems and filesystems have provided support for various types of ACLs for controlling access to objects on a filesystem. An ACL type is a format of an ACL prepared by or for a specific ACL definition. The ACL definition specifies the scheme (including templates, formats, rules, etc.) for using an ACL to govern access of objects. For example, Network Filesystem version 4 ('NFSv4'), OpenAFS, Apple Filing Protocol ('AFP') are filesystems providing support for ACLs of their respective types, and the AIX operating system from International Business Machines Corporation (Armonk, N.Y.) provides support for its own type of ACLs ('AIXC ACLs') in its JFS filesystem and AIX JFS2 filesystem. JFS is an acronym that stands for "Journaled File System." Embodiments of the present disclosure include other types of ACLs that may be developed to better fit specific environments. For example, a partition-based ACL type may be used to restrict access (at least partly) in accordance with a partition ID of a virtual operating system environment partition. Role-based ACL types may be developed to restrict access according to role-based schemes. Partition and Role-based ACL types may be easily implemented using the framework disclosed herein. Custom designed ACL types (e.g., MyACL) may be developed for individual users, companies, and the like, and the definition for these custom designed ACL types may be added to the framework as a choice of ACL type.

The framework allows for the use of multiple ACL types across various applications in a single operating system. Providing a framework in an operating system environment for support of a plurality of ACL types (block 102) may be carried out by decoupling ACL type definitions from the base kernel of the operating system. ACL-related interfaces in kernel space and user space of the operating system are modified for integration with the framework. The framework implements filesystem functionality dependent upon ACL type. For example, the framework may effect functionality of specific ACL definitions through the use of virtual memory mapping of access governing functions of particular ACL definition implementations. Alternatively, the framework may use plug-ins or kernel extensions implementing access governing functions of a particular ACL definition. Another way to decouple ACL types from the kernel is by bringing all of the ACL based checks to user space just above the operating system kernel, for example, by implementing the ACL functionality in wrappers just above the system calls.

Accepting definitions of ACL types (block 104) may be carried out by storing modules comprising ACL type definitions, as is discussed in greater detail with reference to FIG. 6A below. The definitions may be in the form of kernel extensions that are stored in memory. The kernel extensions may be loadable kernel modules that dynamically alter the kernel at run time. The kernel extensions provide an ability to extend the services offered by the operating system kernel. In this particular case, kernel extensions may be plugged into the system to support new ACL types. Note that the kernel extensions define the new ACL types by providing interfaces to handle access checks related to those ACL types.

Figure 2:
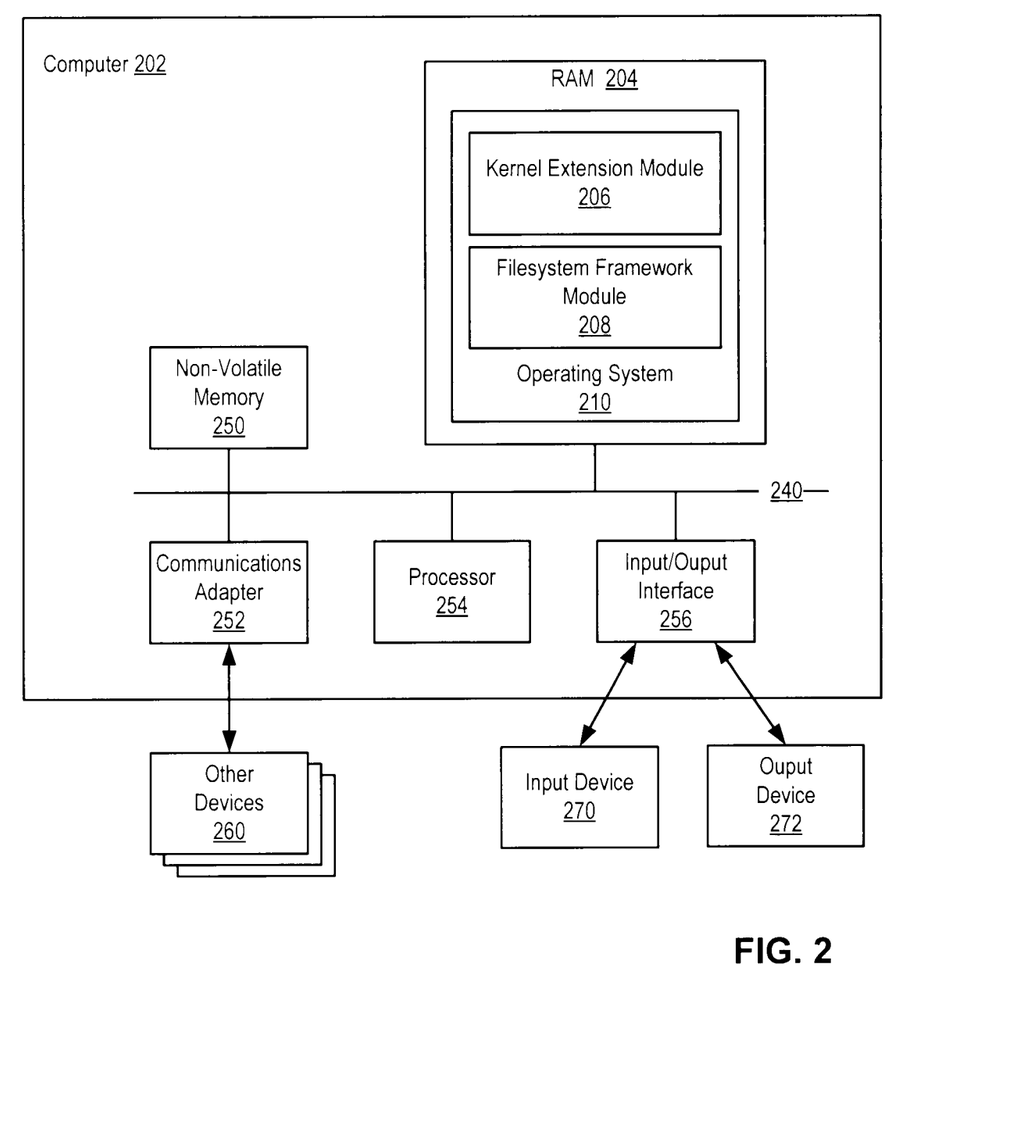
FIG. 2 sets forth a block diagram of an exemplary computer in accordance with one embodiment of the invention.

Embodiments of the presently disclosed invention are implemented to some extent as software modules installed and running on one or more data processing systems ('computers'), such as servers, workstations, tablet computers, PCs, mainframes, other managed systems, and the like. FIG. 2 sets forth a block diagram of an exemplary computer 202. Computer 202 includes at least one computer processor 254 as well as a computer memory, including both volatile random access memory ('RAM') 204 and some form or forms of non-volatile computer memory 250 such as a hard disk drive, an optical disk drive, or an electrically erasable programmable read-only memory space (also known as 'EEPROM' or 'Flash' memory). The computer memory may be connected through a system bus 240 to the processor 254 and to other system components. Thus, the software modules may be program instructions stored in computer memory.

An operating system 210 is stored in computer memory. Operating system 210 may be any appropriate operating system such as Windows XP. Windows Vista, Mac OS X, UNIX, LINUX, Sun Microsystems's Solaris, or AIX from International Business Machines Corporation (Armonk, N.Y.).

Computing device 202 may also include one or more input/output interface adapters 256. Input/output interface adapters 256 may implement user-oriented input/output through software drivers and computer hardware for controlling output to output devices 272 such as computer display screens, as well as user input from input devices 270, such as keyboards and mice.

Computing device 202 may also include a communications adapter 252 for implementing data communications with other devices 260. Communications adapter 252 implements the hardware level of data communications through which one computer sends data communications to another computer through a network.

Also stored in computer memory is a filesystem framework module 208, which may operate at least partially in kernel space. The filesystem framework module 208 includes computer program instructions providing a framework in an operating system environment for support of a plurality of access control list (ACL) types as described herein. The module may include computer program instructions for receiving a request to control access to a filesystem object with an access control list (ACL) of an ACL type corresponding to one of multiple ACL type definitions available in memory, and computer program instructions for, in response to receiving the request to control access to the filesystem object using the ACL of the ACL type, controlling access to the object according to the ACL and the ACL type definition. The module may also include computer program instructions for receiving access control list (ACL) type definitions defining ACL types and storing the access control list (ACL) type definitions in memory.

Also stored in computer memory is kernel extension module 206, which may operate at least partially in kernel mode. The kernel extension module 206 includes computer program instructions implementing a definition of an ACL type as described herein. The module may include computer program instructions for governing access to files according to an ACL of a particular ACL type. Individual developers may develop their own kernel extension modules to define a desired ACL type. For example, the kernel extension may have hooks defined, such as "Add/Edit ACLs" hooks, which allows manipulation of defined ACL types; "Access Checks/Verification" hooks, which manage verification of ACL type; "Remove/Delete" hooks, which remove the ACL type; "Register/Install ACL Type" hooks, which register an ACL type with the kernel, and so on. The kernel extension module 206 may be dynamically loaded at runtime.

The filesystem framework module 208 may be incorporated in operating system 210, including in the kernel. The filesystem framework module 208 may be implemented as one or more sub-modules operating in separate software layers or in the same layer. Although depicted as being incorporated into the operating system 210 in FIG. 2, the filesystem framework module 208 or one or more sub-modules making up the filesystem framework module 208 may be separate from the operating system 210. In particular, invocations of system calls may be implemented in high-level code, such as application code. For example, the request for access to filesystem objects could be made through the filesystem related system calls which are provided by the operating system kernel. In some embodiments, the filesystem framework module 208 may be implemented in the software stack, in hardware, in firmware (such as in the BIOS), or in any other manner as will occur to those of ordinary skill in the art.

Figure 3:
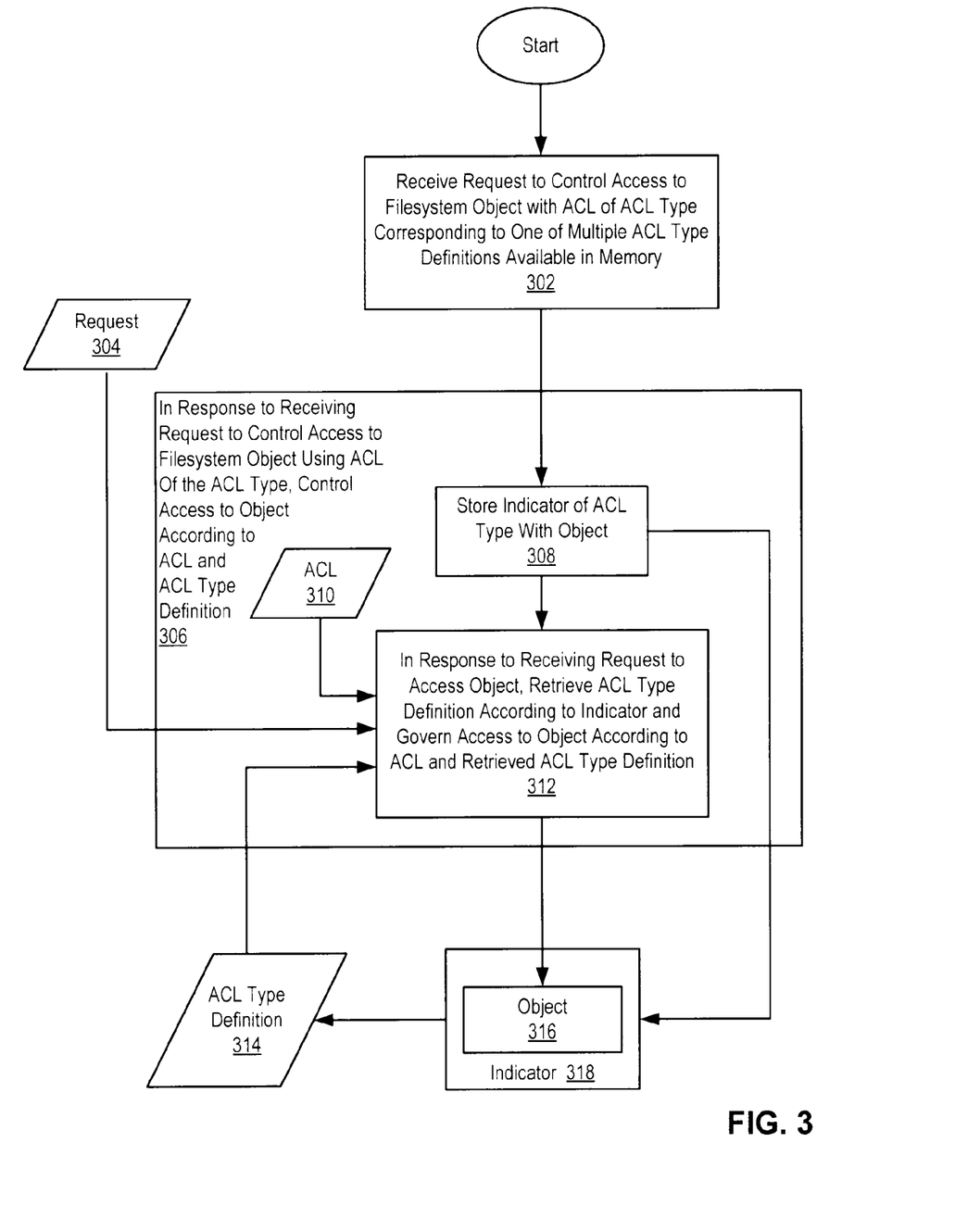
FIG. 3 is a data flow diagram illustrating a method for governing access to objects on a filesystem in accordance with embodiments of the invention.

FIG. 3 is a data flow diagram illustrating a method for governing access to objects on a filesystem in accordance with one embodiment of the invention. The system begins by receiving a request 304 to control access to a filesystem object 316 with an ACL 310 of an ACL type corresponding to one of multiple ACL type definitions 314 available in memory (block 302). Receiving the request 304 to control access to the filesystem object 316 (block 302) may include receiving a request 304 to create or store the object 316. A request may be any of the following operations: create, read, write, execute, change ownership, change access times, change ACL content, and so on. In some implementations, the system is configured to interpret receiving a request to store an object 316 as a request to control access or receiving a request to store an object 316 automatically generates a request 304 to control access of that object 316 with an ACL 310, such as in configurations wherein ACL 310 generation is a default operation of object 316 creation. In other implementations, a user choice in storage mechanisms or a specific command received through a command-line interface or the like generates the request 304. The request 304 to control access to the filesystem object 316 may pertain to an object 316 that has already been stored, possibly for a period of time longer than the duration of a typical user session, such as a period of days, weeks, or years.

In response to receiving the request 304 to control access to the filesystem object 316 using the ACL 310 of the ACL type, the system controls access to the object 316 according to the ACL 310 and the ACL type definition 314 (block 306). Controlling access to the object 316 according to the ACL 310 and the ACL type definition 314 (block 306) may include storing an indicator 318 of the ACL type in association with the object 316 (block 308). For example, the indicator 318 may be a keyed numerical value of the ACL type, a pointer, a flag in a bit position corresponding to the ACL type, a defined text value or variable name, and so on.

Figure 4A:
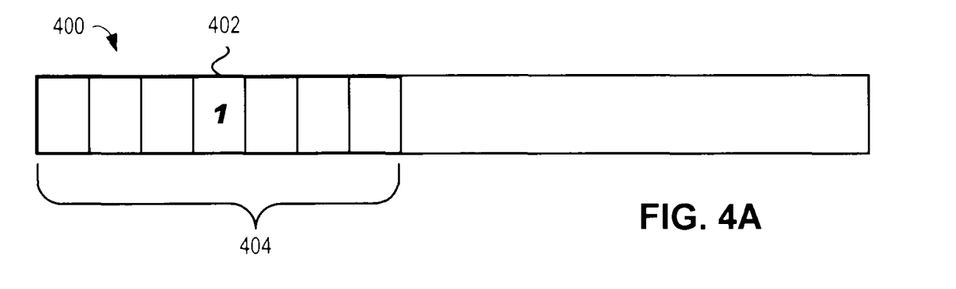
FIGS. 4A and 4B illustrate data structures for storing an indicator of the ACL type in association with an object.
Figure 4B:
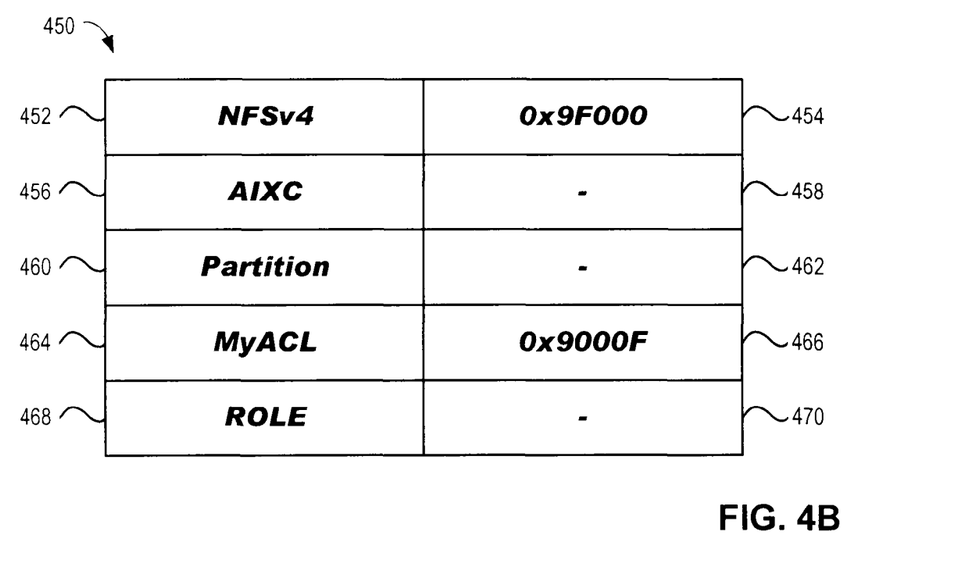

FIGS. 4A and 4B illustrate data structures for storing an indicator 318 of the ACL type in association with the object. Referring to FIG. 4A, file 400 comprises a group of mode bits 404. The extensible bit 402 signifies whether an ACL is associated with the object. In this instance, the extensible bit 402 is set to 1, indicating that an ACL is associated with the object.

Extended attributes are data structures that enable users to associate computer files with data not strictly defined by the filesystem. Indicators 318 may be stored in extended attributes. Referring to FIG. 4B, extended attribute 450 includes names 452, 456, 460, 464, 468 paired with associated values 454, 458, 462, 466, 470. The names 452, 456, 460, 464, 468 are indicators comprising a text value corresponding to predefined ACL types. The associated values 454, 458, 462, 466, 470 comprise a pointer corresponding to memory addresses containing the ACL of the named type. For example, the names NFSv4 452 and MyACL 464 indicate the ACL types NFSv4 ACL and a custom ACL type named MyACL, respectively, that correspond to ACL type definitions available in memory. The names AIXC ACL 456, Partition ACL 460, and ROLE ACL 468 each correspond to null values 458, 462, 470, which indicate that ACLs of these types do not govern the file.

Returning to FIG. 3, in response to receiving a request 304 to access the object 316, the system retrieves the ACL type definition 314 according to the indicator 318 and governs access to the object 316 according to the ACL 310 and the retrieved ACL type definition 314 (block 312). Retrieving the ACL type definition 314 according to the indicator 318 may be carried out by resolving the indicator 318. For example, if the indicator 318 is a keyed numerical value, retrieving the ACL type definition 314 according to the indicator 318 may include performing a lookup of the keyed numerical value in a lookup table and following a pointer associated with the keyed numerical value to the section of memory containing the ACL type definition 314.

Figure 5:
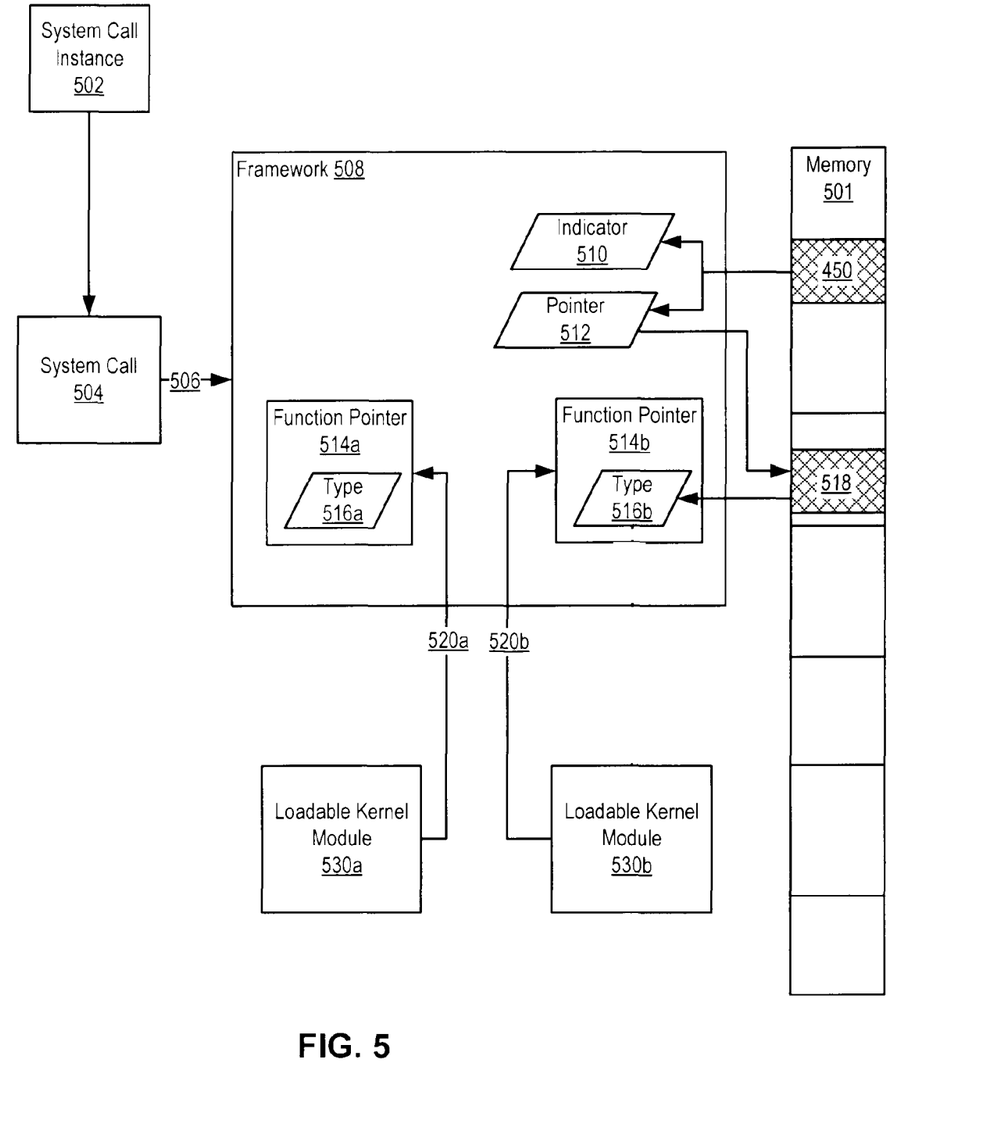
FIG. 5 sets forth a data flow diagram illustrating a framework for governing access to objects on a filesystem in accordance with an embodiment of the invention.

Controlling access to the object according to the ACL and the ACL type definition (block 304) may be carried out through the framework. FIG. 5 sets forth a data flow diagram illustrating a framework for governing access to objects on a filesystem in accordance with embodiments of the invention.

Applications may invoke an instance of a filesystem operation system call 502, such as, for example, a create, open, rename, change ACL content, link, or unlink call, or any other filesystem related operations that may perform an access check as part of the operation. The instance of the filesystem operation system call 502, when invoked during execution, requests an execution of the create system call function 504 from the kernel. The create system call 504 utilizes ACL in governing access to files. Before performing the actual filesystem operation, the system call will first check if the user/process has permission to access the file or not. This will be done using the ACL framework 508. The create system call 504 makes a system call (506) to the framework 508 to perform access verification under any related ACL.

The framework 508 detects the indicator, for example, by reading mode bit 402 (see FIG. 4A), which is set to 1. The framework 508 retrieves the indicator 510 of ACL type from storage, such as, for example, extended attribute 450. The framework 508 also retrieves the ACL (or the pointer 512 specifying the ACL location 518 in memory 501) that corresponds to the ACL type 510. If a plurality of ACL types is defined, the framework retrieves each ACL type (and any ACLs corresponding to them).

For each ACL type 516a, 516b, the framework 508 has previously dynamically loaded a kernel extension implementing the ACL type definition. The kernel extension provides additional kernel services and system calls by specifying an export file when it is link-edited. This export file contains a list of symbols to be added to the kernel name space. When a new kernel extension is loaded, any symbols exported by the kernel extension are added to the kernel name space, and are available to all subsequently loaded kernel extensions. Similarly, system calls exported by a kernel extension are available to all applications or shared objects subsequently loaded. Function pointers dynamically load the kernel extension by linking 520a, 520b loadable kernel modules 530a, 530b implementing the kernel extensions.

The loadable kernel modules 530a, 530b may be Executable and Linkable Format ('ELF') object files. Linking the object files resolve their symbols and results in executables. The loadable kernel module 530a exports calls, such as system call 514a, which provide the functionality of the ACL having the ACL type 516a. The loadable kernel module 530b exports calls, such as system call 514b, which provide the functionality of the ACL having the ACL type 516b.

The framework, retrieving the indicator of ACL type 516b, invokes the system call 514b. The instance of system call 514b, when invoked, requests an execution of the access governing functions for ACL type 516b from the loadable kernel module 530b. Upon determining access rights, the calls return to create system call 504.

Figure 6A:
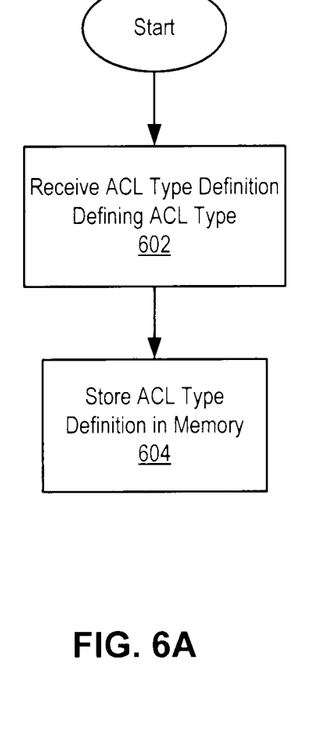
FIGS. 6A and 6B are flow charts illustrating methods for governing access to objects on a filesystem in accordance with embodiments of the invention.

FIG. 6A is a flow chart illustrating a method for governing access to objects on a filesystem in accordance with one embodiment of the invention. The method comprises receiving an ACL type definition defining the ACL type (block 602), and storing the ACL type definition in memory (block 604). Receiving an ACL type definition defining the ACL type (block 602) may be carried out by receiving the ACL type definition as a file. Storing the ACL type definition in memory (block 604) may comprise storing the ACL type definition in long-term non-volatile memory. The memory footprint for the kernel may be minimized by loading only those elements (definitions) that are needed into active memory.

Figure 6B:
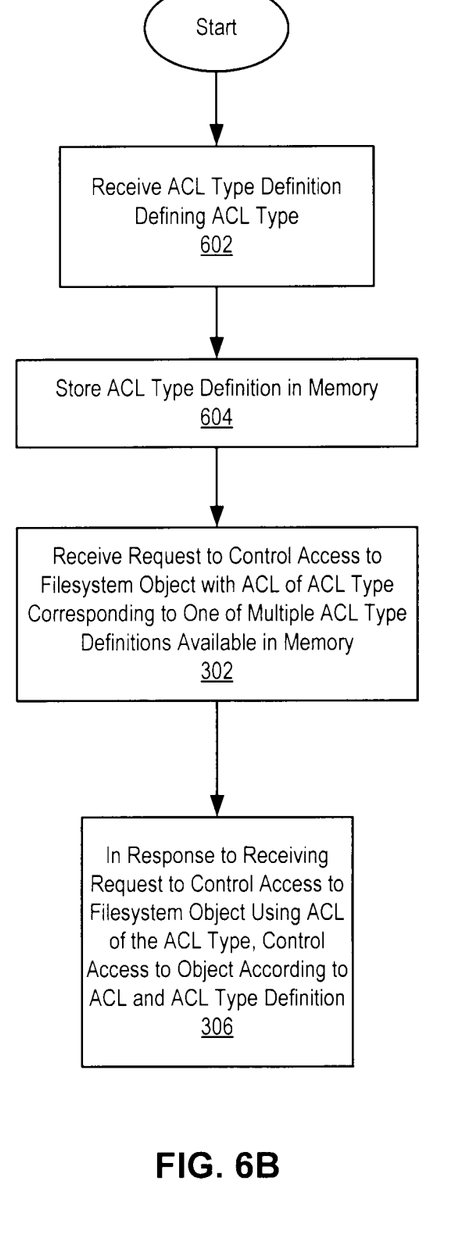

FIG. 6B is a flow chart illustrating a method for governing access to objects on a filesystem in accordance with one embodiment of the invention. The method comprises receiving an ACL type definition defining the ACL type (block 602), and storing the ACL type definition in memory (block 604), as described above in reference to FIG. 6A. The method further comprises receiving a request to control access to a filesystem object with an ACL of an ACL type corresponding to one of multiple ACL type definitions available in memory (block 302); and controlling access to the object according to the ACL and the ACL type definition (block 306), as described above with reference to FIG. 3. The method of FIG. 6B allows for external definition of ACL types and facilitation of implementing the externally defined ACL type by an ACL framework.

It should be understood that the inventive concepts disclosed herein are capable of many modifications. To the extent such modifications fall within the scope of the appended claims and their equivalents, they are intended to be covered by this patent.

What is claimed is:

1. A computer-implemented method for governing access to one or more objects on a filesystem, the method comprising: providing a framework in an operating system environment for support of a plurality of access control list (ACL) types;
    accepting a plurality of ACL type definitions, each ACL type definition corresponding to at least one of the plurality of ACL types and being implemented by a corresponding kernel extension; and
    controlling access to a filesystem object in response to receiving a request to control access to the filesystem object, the filesystem object associated with an ACL type, the controlling access comprising:
        dynamically loading the kernel extension corresponding to the ACL type, the kernel extension implementing the ACL type definition associated with the ACL type;
        adding to a kernel namespace one or more symbols exported by the dynamically loaded kernel extension; and making the one or more symbols added to the kernel namespace available to one or more subsequently loaded kernel extensions;

wherein controlling access to the filesystem object further comprises:

storing an indicator of the ACL type in association with the filesystem object; and in response to receiving the request to control access to the filesystem object, retrieving the ACL type definition according to the indicator and governing access to the filesystem object according to the ACL and the retrieved ACL type definition.

2. The computer-implemented method of claim 1, the accepting a plurality of ACL type definitions further comprising, prior to receiving the request to control access to the filesystem object: receiving the ACL type definition defining the ACL type; and storing the ACL type definition in memory.

3. The computer-implemented method of claim 1, wherein receiving a request to control access to the filesystem object comprises receiving a request to store the filesystem object.

4. The computer-implemented method of claim 1, wherein receiving a request to control access to the filesystem object comprises receiving a request to create the filesystem object.

5. The computer-implemented method of claim 1, the storing the indicator of the ACL type in association with the filesystem object comprising storing the indicator as an extended attribute of the filesystem object.

6. The computer-implemented method of claim 1, the providing a framework comprising decoupling ACL type definitions from the kernel of the operating system.

7. The computer-implemented method of claim 1, the kernel extension comprising one or more loadable kernel modules.

8. A computer program product for governing access to one or more objects on a filesystem, the computer program product comprising:

a computer readable storage medium having computer readable program code embodied thereon, the computer readable program code comprising:

computer readable code configured to provide a framework in an operating system for support of a plurality of access control list (ACL) types, the operating system comprising a kernel;

computer readable code configured to accept a plurality of ACL type definitions, each ACL type definition corresponding to at least one of the plurality of ACL types and being implemented by a corresponding kernel extension; and computer readable code configured to control access to a filesystem object in response to receiving a request to control access to the filesystem object, the filesystem object associated with an ACL type, the computer readable code configured to control access comprising:

computer readable code configured to dynamically load the kernel extension corresponding to the ACL type, the kernel extension implementing the ACL type definition associated with the ACL type;

computer readable code configured to add to a kernel namespace one or more symbols exported by the dynamically loaded kernel extension; and computer readable code configured to make the one or more symbols added to the kernel namespace available to one or more subsequently loaded kernel extensions;

wherein the computer readable code configured to control access to the filesystem object further comprising:

computer readable code configured to store an indicator of the ACL type in association with the filesystem object; and computer readable code configured to, in response to receiving the request to control access to the filesystem object, retrieve the ACL type definition according to the indicator and govern access to the filesystem object according to the ACL and the retrieved ACL type definition.

9. The computer program product of claim 8, the computer readable code configured to accept a plurality of ACL type definitions further comprising: computer readable code configured to receive the ACL type definition defining the ACL type prior to receiving the request to control access to the filesystem object; and computer readable code configured to store the ACL type definition in memory.

10. The computer program product of claim 8, the computer readable code configured to receive a request to control access to the filesystem object comprising computer readable code configured to receive a request to store the filesystem object.

11. The computer program product of claim 8, the computer readable code configured to receive a request to control access to the filesystem object comprising computer readable code configured to receive a request to create the filesystem object.

12. The computer program product of claim 8, the computer readable code configured to store the indicator of the ACL type in association with the filesystem object comprising computer readable code configured to store the indicator as an extended attribute of the filesystem object.

13. The computer program product of claim 8, the computer readable code configured to provide a framework comprising computer readable code configured to decouple ACL type definitions from the kernel of the operating system.

14. The computer program product of claim 8, wherein the kernel extension comprises one or more loadable kernel modules.

15. A system for governing access to one or more objects on a filesystem, the system comprising:

a processor; and a computer memory operatively coupled to the processor, the computer memory having disposed therein:

computer readable code configured to provide a framework in an operating system for support of a plurality of access control list (ACL) types, the operating system comprising a kernel;

computer readable code configured to accept a plurality of ACL type definitions, each ACL type definition corresponding to at least one of the plurality of ACL types and being implemented by a corresponding kernel extension; and computer readable code configured to control access to a filesystem object in response to receiving a request to control access to the filesystem object, the filesystem object associated with an ACL type, the computer readable code configured to control access comprising:

computer readable code configured to dynamically load the kernel extension corresponding to the ACL type, the kernel extension implementing the ACL type definition associated with the ACL type;

computer readable code configured to add to a kernel namespace one or more symbols exported by the dynamically loaded kernel extension; and computer readable code configured to make the one or more symbols added to the kernel namespace available to one or more subsequently loaded kernel extensions;

wherein the computer readable program code configured to control access to the filesystem object according to the ACL and the ACL type definition comprises:

computer readable program code configured to store an indicator of the ACL type in association with the filesystem object; and computer readable program code configured to, in response to receiving the request to control access to the filesystem object, retrieve the ACL type definition according to the indicator and govern access to the filesystem object according to the ACL and the retrieved ACL type definition.

16. The system of claim 15, the computer memory having further disposed therein: computer readable program code configured to receive the ACL type definition defining the ACL type; and computer readable program code configured to store the ACL type definition in memory.

17. The system of claim 15, wherein the computer readable program code configured to receive the request to control access to the filesystem object further comprises computer readable program code configured to receive a request to store the filesystem object.

18. The system of claim 15, wherein the computer readable program code configured to receive the request to control access to the filesystem object further comprises computer readable program code configured to receive a request to create the filesystem object.

19. The system of claim 15, wherein the computer readable program code is configured to store the indicator of the ACL type with the filesystem object comprises computer readable program code configured to store the indicator as an extended attribute of the filesystem object.

20. The computer-implemented method of claim 1, the controlling access to the filesystem object further comprising: making one or more system calls exported by the dynamically loaded kernel extension available to a subsequently loaded application and/or a shared object on the filesystem.

21. The computer-implemented method of claim 1, wherein a function pointer dynamically loads the kernel extension implementing the ACL type definition by linking a loadable kernel module to the ACL type corresponding to the ACL type definition, the loadable kernel module implementing the kernel extension.

22. The computer program product of claim 8, the computer readable program code configured to control access to the filesystem object further comprising:

computer readable program code configured to make one or more system calls exported by the dynamically loaded kernel extension available to a subsequently loaded application and/or shared object on the filesystem.

23. The computer program product of claim 8, the computer readable program code configured to control access to the filesystem object further comprising: computer readable program code configured to dynamically load the kernel extension implementing the ACL type definition by using a function pointer to link a loadable kernel module to the ACL type corresponding to the ACL type definition, the loadable kernel module implementing the kernel extension.

24. The system of claim 15, the computer readable program code configured to control access to the filesystem object further comprising: computer readable program code configured to make one or more system calls exported by the dynamically loaded kernel extension available to a subsequently loaded application and/or shared object on the filesystem.

* * * * *